Jan. 22, 1957   M. L. BENJAMIN ET AL   2,778,648
COMPENSATING DRIVER FOR TAP CHUCKS AND THE LIKE
Filed March 26, 1954
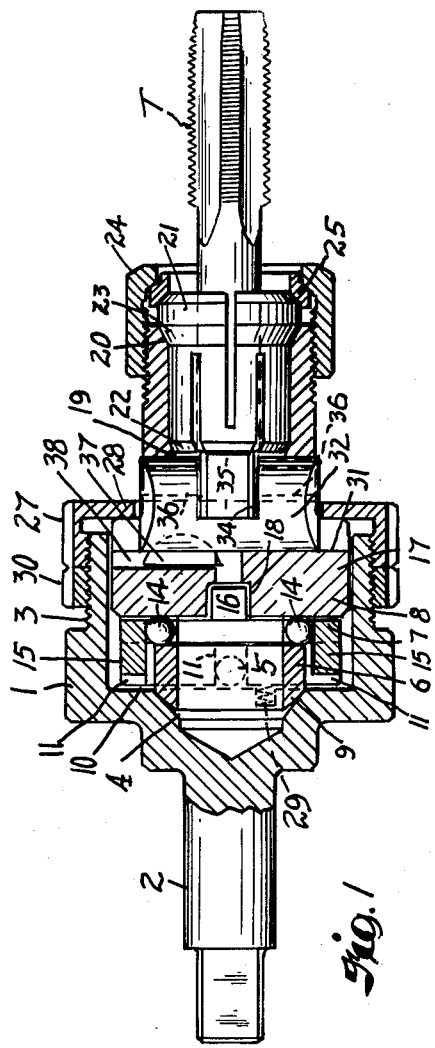
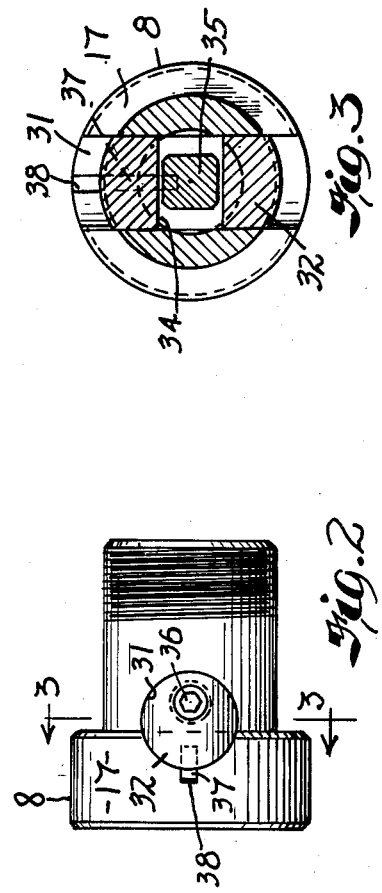
INVENTORS
MILTON L. BENJAMIN,
BY STANLEY S. BENJAMIN
Oberlin & Limbach
ATTORNEYS 2,778,648
Patented Jan. 22, 1957

2,778,648

COMPENSATING DRIVER FOR TAP CHUCKS AND THE LIKE

Milton L. Benjamin and Stanley S. Benjamin, Cleveland, Ohio, assignors to Erickson Tool Company, a corporation of Ohio Application March 26, 1954, Serial No. 419,043

1 Claim. (Cl. 279—18)

The present invention relates generally as indicated to a compensating driver for tap chucks and the like, and has for one of its principal objects the provision of a compensating driver of the character indicated which is of simplified form, inexpensive to make and install, and is foolproof in operation.

Other objects and advantages of the present invention will become apparent as the following description proceeds.

To the accomplishment of the foregoing and related ends, the invention, then, comprises the features hereinafter fully described and particularly pointed out in the claim, the following description and the annexed drawing setting forth in detail certain illustrative embodiments of the invention, these being indicative, however, of but a few of the various ways in which the principle of the invention may be employed.

In said annexed drawing:

Fig. 1 is a longitudinal cross-section view of a floating tool holder equipped with the compensating driver constituting the present invention;

Fig. 2 is a top plan view of the holder shank and compensating driver therein; and Fig. 3 is a cross-section view taken substantially along the line 3—3, Fig. 2.

Referring now more particularly to the drawing, and especially to Fig. 1 thereof, the floating tool holder is shown as comprising a body or housing 1 which is provided with an elongated shank 2 adapted to be secured to the tool spindle of a metal working machine. Said housing 1 is further provided with an exteriorly threaded portion 3 within which is formed a conical seat 4, and at diametrically opposite sides of said portion 3 adjacent said seat 4 and extending radially are a pair of cylindrical pins 5 press-fitted or otherwise secured in place. Said pins 5 extend radially inward to points adjacent the base of said conical seat 4.

Within the tubular portion 3 of said housing 1 is a series of three members 6, 7, and 8 respectively having a universally tiltable driving connection with said housing 1 and transversely movable driving connections with each other along angularly disposed paths.

The first of said series of members is a drive ring 6 which is formed with a spherical protuberance 9 adapted to make line contact engagement with the conical seat 4 and formed with a radially extending flange 10. Said flange 10 is formed with four equally spaced peripheral notches 11, two of which notches are adapted to fit reasonably closely over the inwardly projecting ends of said pins 5 for securing a positive driving engagement between housing 1 and ring 6 while allowing universal tilting of the latter while engaged with seat 4. The center line of said pins 5 preferably coincides with the center of the spherical protuberance 9 whereby the notches 11 may reasonably closely embrace the ends of said pins and yet said ring 6 may be universally tilted.

The second, or intermediate, one of said series of members is a ball retainer ring 7 carrying a plurality of circularly arranged balls 14 therein, each of diameter greater than the thickness of said ring 7, the balls 14 being held in place in said ring 7 as by peening over of the edges of the openings in which the balls are fitted.

As shown, said ring 7 is formed with diametrically opposed axially extending lugs 15 which are adapted to fit with some clearance within the other pair of notches 11 in said drive ring 6 to secure positive driving of ring 7 through ring 6 and adjustment of the former along a path transverse to its axis, that is, in a direction parallel to the opposed lugs 15. Said ring 7 is further formed with another pair of similarly diametrically opposed lugs 16 which extend axially in the opposite direction from and 90° out of phase with said lugs 15.

The third or last one of said series of members is a floating holder shank 8 of tubular form threaded at one end, as shown, and formed with a flange 17 at the other end, such flange 17 having a pair of diametrically opposed notches 18 adapted to fit over said lugs 16 of said ball retainer ring 7 whereby said holder shank 8 may also be adjusted transversely of its axis but along a path at right angles to the path of transverse adjustment of said bar retainer ring 7. The fit of the notches 18 over the lugs 16 provides a driving connection between said ball retainer ring 7 and said holder shank 8.

It is to be understood that the holder shank 8 may be of any of the types shown in Figs. 1, 3, and 4 of the Benjamen et al. Patent No. 2,547,518, granted April 3, 1951. The holder shank 8 as herein shown is formed to accommodate a contractible collet, and for such purpose said shank 8 is provided with a bore having coaxial and axially spaced conical seats 19 and 20 comparable with the seats formed in the like shank member disclosed in the aforesaid patent, and, as well, in the Milton L. Benjamin et al. Patent No. 2,358,300, dated September 19, 1944.

A contractible collet 21 is fitted into the bore of said shank member 8, said collet having conical faces 22 and 23 respectively engageable with the conical seats 19 and 20; and, as apparent, axial movement of said collet 21 into said holder shank will effect contraction of said collet so as to grip a tool or the like therein, which tool in the present case is shown as a threading tap T. The collet 21 is moved endwise into the holder shank 8 as by means of the nose piece 24 which is threaded onto said shank 8 and bears on the outer end of said collet through the intermediary of a nose ring 25.

The series of members 6, 7, and 8 are clamped in said housing 1 by means of a clamp nut 27 which is threaded onto said housing 1 and which has an inturned flange 28 engaging the flange of said holder shank 8. The bore through said clamp nut 27 is somewhat larger than the diameter of the holder shank 8 so that the latter may be angularly or eccentrically positioned therewithin.

Interposed between the drive ring 6 and housing 1 are a series of coil springs 29; and, of course, instead of coil springs, a wavey spring washer or the like may be employed which bears against the flange 10 of said ring. In the use of the full floating holder as just described, the shank of the threading tap T or like tool is positioned within collet 21 and the nose piece 24 is tightened to grip said tool.

The nut 27 is tightened to cause the spherical protuberance 9 to engage the seat 4 and then is backed off a very slight amount, preferably less than a quarter-turn, and locked in such position as by means of the check nut 30. In this condition of the parts, there is a few thousandths inch clearance between the spherical protuberance 9 and its conical seat 4 whereby the tap T gripped by said collet 21 may readily align itself with the hole in the workpiece which is to be threaded thereby and thus may partake of angular and also parallel movement for such purpose.

The holder shank 8 is, in this case, formed with a circular cross-section bore 31 diametrically therethrough in which a circular cross-section compensating driver 32 is slidably mounted. The ends of said driver 32 are rounded, as shown, to a diameter somewhat less than the diameter of the bore through clamp nut 27 so that said driver may partake of lateral or diametral adjusting movement with reference to the holder shank 8.

Said driver 32 is formed with a slot 34 thereacross and intermediate its ends, the opposite sides of said slot being parallel and spaced apart a distance at least equal to the size of the square tang 35 of the largest tap T which can be accommodated by the holder shank 8 and collet 21, and the bottom of said slot is adapted to be abutted by the end of said tang 35. Threaded into the opposite ends of said driver 32 are set screws 36 which are adapted to be turned so that their ends frictionally engage the opposite sides of the square tang 35 to thus provide a positive driving connection between the holder shank 8 and the tap T or like tool held thereby. In screwing down the set screws 36, it is preferred to screw down each approximately the same amount, although this is not necessary, because of the slidable mounting of driver 32 in the bore 31 of the holder shank 8; and, therefore, the positive driving connection is achieved without, in any way, tending to force the tap or like tool T off center or out of alignment.

In order to hold the driver 32 against rotation within the bore 31, and thus to maintain the slot 34 in a position to receive the square tang 35 of the tool T, there is provided a key 37 on said driver which slidably engages a key-way 38 formed in the holder shank 8.

Thus, it can be seen that the compensating driver 32 herein illustrated is a very simple form and does not require special forming in the holder shank 8, by broaching or otherwise, a square or other non-circular cross-section hole in which a compensating driver of complementary cross-section would be non-rotatable and transversely slidable with respect to the holder shank. It is to be understood that, in some instances, as where the variation in the sizes of the tangs is not very great, one set screw 36 will suffice, in which event the tang 35 will be solidly gripped between one side of the slot 34 and the end of said one set screw bearing against the opposite side.

With the tap T thus gripped by the collet and positively driven by the holder shank through the compensating driver 32, the tap T may, by reason of the full floating holder construction, partake of eccentric or annular misalignment with respect to the housing 1, whereby said tap T will enter and accurately form threads in a previously drilled or reamed hole in a workpiece.

Certain features of the full floating holder are covered by the Milton L. Benjamin et al. Patent No. 2,358,300 aforesaid, and certain improvements therein are covered in the copending application of Milton L. Benjamin et al. Serial No. 418,976, filed March 26, 1954.

Other modes of applying the principle of the invention may be employed, change being made as regards the details described, provided the features stated in the following claim, or the equivalent of such, be employed.

We therefore particularly point out and distinctly claim as our invention:

In a tool holder, the combination of a housing assembly, a holder shank projecting outwardly from said housing assembly and adapted to hold a tool therein of the type having a non-circular cross-section tang, said holder having an end portion non-rotatably engaged with said housing assembly and providing an adjacent outwardly facing shoulder, a clamp nut threadedly engaged with said housing assembly and having an inturned flange which engages such shoulder to clamp said shank and housing assembly together, said shank being formed with a circular cross-section bore diametrically thereacross, a circular cross-section compensating driver axially slidably keyed in such bore and having a slot formed in its side adapted to receive such tang therein, said driver having a portion thereof disposed within the flange of said nut so as to be retained thereby against withdrawal from the bore of said shank, and a set screw longitudinally threaded into a portion of said driver outward beyond such flange and having its inner end extending into such slot to frictionally engage a side of such tang.

References Cited in the file of this patent

UNITED STATES PATENTS

| 335,009 | Barnes | June 26, 1886 |
| 632,810 | Errington | Sept. 12, 1899 |
| 836,376 | Fancher | Nov. 20, 1906 |
| 942,304 | Bomborn et al. | Dec. 7, 1909 |
| 1,763,717 | Morgan | June 17, 1930 |
| 1,958,817 | Gase | May 15, 1934 |
| 2,516,709 | Lustenberger et al. | July 25, 1950 |

FOREIGN PATENTS

| 13,075 | Great Britain | June 9, 1902 |

OTHER REFERENCES

"Tools, Chucks and Fixtures" (A. A. Dowd), published by the Industrial Press, 1915 (page 66 relied on).